United States Patent [19]

Inoue et al.

[11] Patent Number: 5,116,908
[45] Date of Patent: May 26, 1992

[54] THERMOPLASTIC RESIN COMPOSITION

[75] Inventors: Toshio Inoue, Kawasaki; Masaaki Miyazaki, Yokohama; Shiuzi Kashiwase, Kawasaki, all of Japan

[73] Assignee: Nippon Petrochemicals Company, Limited, Tokyo, Japan

[21] Appl. No.: 540,939

[22] Filed: Jun. 20, 1990

[30] Foreign Application Priority Data

Jun. 27, 1989 [JP] Japan .................................. 1-162646

[51] Int. Cl.$^5$ ........................ C08F 8/00; C08L 23/10
[52] U.S. Cl. .................................... 525/193; 525/194
[58] Field of Search ................... 525/133, 193, 194

[56] References Cited

U.S. PATENT DOCUMENTS

| | | | |
|---|---|---|---|
| Re. 30,405 | 9/1980 | Fischer ........................... | 525/240 |
| 3,806,558 | 5/1974 | Fischer ........................... | 525/198 |
| 4,160,859 | 7/1979 | Renner et al. ................... | 528/322 |
| 4,929,665 | 5/1990 | Inoue et al. ..................... | 525/64 |

OTHER PUBLICATIONS

Loudon, G. Marc. "Organic Chemistry", Addison-Wesley Pub. Co. Reading, Mass., 1984, (pp. 571–575).

*Primary Examiner*—John C. Bleutge
*Assistant Examiner*—Thomas Hamilton, III
*Attorney, Agent, or Firm*—Dilworth & Barrese

[57] ABSTRACT

Partially crosslinked, thermoplastic resin compositions prepared by dynamically heat-treating a thermoplastic resin, having substantially no carbon-carbon bond unsaturation, in the presence of: a dihydroaromatic compound as a crosslinking agent, said dihydroaromatic compound being selected from the group consisting of a 1,2-dihydroquinoline compound, a polymer thereof and 9,10-dihydrophenanthrene; and a polyfunctional monomer, such as a bismaleimide compound.

6 Claims, No Drawings ic resin composition and more particularly to a thermoplastic resin composition well-balanced in rigidity, impact resistance, flexibility and processability.

THERMOPLASTIC RESIN COMPOSITION

BACKGROUND OF THE INVENTION

The present invention relates to a novel thermoplastic resin composition and more particularly to a thermoplastic resin composition well-balanced in rigidity, impact resistance, flexibility and processability.

Thermoplastic resins are utilized in various industrial fields as materials superior in moldability. Besides, their utilization fields have been expanded by being blended for modification with resins having various properties and fillers. It is also well known that effects of such blending, for example, improvement of impact resistance and that of heat resistance are attained by dynamically heat-treating the resulting mixtures. As the method for dynamically heat-treating a thermoplastic resin substantially not having an unsaturated carbon-carbon bond it is known to utilize an organic peroxide. However, as to compositions obtained by such method utilizing organic peroxides, improvements have been desired in the following points.

As exemplified in Japanese Patent Publication No. 34210/1978 (U.S. Pat. No. 3,806,558), since a free radical initiator typified by an organic peroxide is used, there is obtained a composition which exhibits good fluidity in injection molding in the case where the thermoplastic resin used is an organic peroxide non-crosslinked type resin such as a polypropylene resin, but the organic peroxide remaining in the composition deteriorates the thermal stability and weathering resistance of the composition and there occurs a thermal decomposition of the organic peroxide rapidly, resulting in that a molecular cutting reaction is unavoidable, thus leading to deterioration of mechanical characteristics such as yield strength, bending strength, and flexural modulus. Moreover, in the case where the composition is used in extrusion or blow molding, there arise problems such as deterioration of drawdown resistance, and surface roughening and insufficient elongation of parison. Also in injection modling the gloss of the resulting molded product is poor, thus affecting the beaty of the commodity. Organic peroxide crosslinked type resins such as polyethylene resins are either unemployable because of marked deterioration in fluidity of the composition obtained or require the use of an extremely small amount of an organic peroxide, thus it is difficult to handle them. Further, when the above conventional method is used, there inevitably arise such problems as poor stability and safety of the free radical forming agent during storage and dynamic treatment thereof, as well as thermal decomposition loss due to the adhesion to heated inner walls of a processing machine.

It is an object of the present invention to overcome the above-mentioned problems of the prior art.

It is another object of the present invention to provide an improved thermoplastic resin composition by crosslinking a thermoplastic resin using a crosslinking reaction as a drawback of conventional organic peroxides and which was found out by the present inventors.

SUMMARY OF THE INVENTION

Having made extensive studies along the above-mentioned objects, the present inventors found out that a composition extremely superior in comparison with those obtained using conventional organic peroxides is obtained by using a dihydroaromatic compound or a polymer thereof as a crosslinking agent and a polyfunctional monomer in crosslinking a thermoplastic resin substantially not containing an unsaturated carbon-carbon bond.

More specifically, the present invention resides in a partially crosslinked, thermoplastic resin composition prepared by dynamically heat-treating a thermoplastic resin substantially not containing an unsaturated carbon-carbon bond in the presence of a dihydroaromatic compound or a polymer thereof as a crosslinking agent and a polyfunctional monomer.

DETAILED DESCRIPTION OF THE INVENTION

The present invention will be described in detail hereinunder.

The thermoplastic resin used in the present invention can be selected from a wide range of resins substantially not containing an olefinic unsaturated carbon-carbon bond. Examples are polyolefin resins such as crystalline polypropylenes, propylene-α-olefin random copolymers, high and medium density polyethylens, polybutene-1, poly-4-methylpentene-1, high pressure process low-density polyethylenes, linear chain low-density polyethylenes, very-low density polyethylenes (VLDPE), ethylene-α-olefin copolymer rubbers, ethylene-unsaturated carboxylate copolymers, and ethylene-carboxylic acid unsaturated ester copolymers, as well as polystyrene resins, polyacrylonitrile resins, polymethacrylate resins, polyamide resins, polyester resins, polycarbonate resins, polyphenylene resins, polyacetal resins, and mixtures thereof.

The very-low density polyethylenes (VLDPE) referred to above indicate polyethylenes not higher than 0.910 g/cm$^3$ in density and exhibiting intermediate properties between linear low-density polyethylenes and ethylene-α-olefin copolymer rubbers.

For example, a specific ethylene-α-olefin copolymer having a density of 0.860 to 0.910 g/cm$^3$, a maximum peak temperature (Tm) of not lower than 100° C. as measured according to a differential scanning calorimetry (DSC) and a boiling n-hexane insolubles content of not lower than 10 wt % is prepared by using a catalyst comprising a magnesium- and titanium-containing solid catalyst component and an organoaluminum compound. This resin possesses both a high crystalline portion which a straight chain low-density polyethylene exhibits and an amorphous portion which an ethylene-α-olefin copolymer rubber exhibits. High mechanical strength and heat resistance which are features of the former and rubbery elasticity and low-temperature impact resistance which are features of the latter are present in a well-balanced state. The use of this resin is very useful in the present invention because there is obtained a thermoplastic resin composition superior in various points, as will be described later.

According to the present invention, by changing the kind and proportion of the thermoplastic resin to be used, There can be obtained a wide variety of partially cross-linked thermoplastic resin compositions having various properties.

The dihydroaromatic compound used as a crosslinking agent in the present invention is a compound containing one or more aromatic rings in which at least one aromatic ring has been dihydrogenated. The aromatic ring as referred to herein indicates a ring structure having 4n+2 (n is an integer) of π-electrons mentioned in the definition of aromaticity [see, for example, "Fundamentals of Organic Chemistry," translated by Toshio Goto, pp. 105-106, Tokyo Kagaku Dojin K. K. (1976), (Richard S. Mon-son & John C. Shelton; Fundamentals of Organic Chemistry, MacGraw-Hill, Inc. (1974)]. Examples include pyridine and quinoline, and hence examples of the dihydroaromatic compound used in the present invention include dihydro derivatives of quinoline.

The dihydroaromatic compound used in the present invention may contain a substituent group. Its alkyl-, various elements- and functional groups-substituted derivatives are employable. Such dihydroaromatic compounds can be prepared by the application of known chemical reactions. Examples of those available at present are 1,2-dihydrobenzene, cis-1,2-dihydrocatechol, 1,2-dihydronaphthalene, 9, 10-dihydrophenanthrene, as well as such 1,2-dihydroquinoline compounds as 6-decyl-2,2,4-trimethyl-1,2-dihydroquinoline, 6-ethoxy-2,2,4-trimethyl-1,2-dihydroquinoline and 2,2,4-trimethyl-1,2-dihydroquinoline. Polymers of these compounds are also employable.

It is presumed that the crosslinking agent acts on carbon-hydrogen bond of the thermoplastic resin to form carbon radical and per exhibits a resonant structure after release of the radical and is stabilized. The carbon radical thus formed is weak in its hydrogen withdrawing ability from the carbon-hydrogen bond as compared with oxygen radical formed by cleavage of the foregoing organic peroxide, so does not exhibit a degradation reaction even for a peroxide decomposition type thermoplastic resin such as polypropylene, nor does it exhibit an excessive cross-linking reaction even for a peroxide crosslinking type thermoplastic resin such as polyethylene. Thus, it is easy to make reaction control and so even crosslinking of an extremely limited part which has so far been considered difficult by the use of an organic peroxide can be effected.

Although the crosslinking agent may be used directly as above, there may be adopted a method wherein the crosslinking agent is prepared by a reaction during melt-kneading. This reaction may be selected optionally, but it is desirable to start from a compound which easily reacts on heating, in order to avoid the addition of a catalyst, etc. Particularly, Diels-Alder reaction is preferred. In this case, however, it is desirable to add the compound in the form of a dihydroaromatic compound.

The dihydroaromatic compounds employable in the present invention have heretofore been known as antioxidants for rubber (see, for example, Japanese Patent Publication No. 46661/1980). Heretofore, however, they have been used not as crosslinking agents but together with other crosslinking agents such as sulfur compounds, quinone dioxime compounds, phenolic compounds, or organic peroxides. Thus, the prior arts do not suggest the feature of the present invention that a mild crosslinking reactivity is attained by the use of only a dihydroaromatic compound or a polymer thereof and a polyfunctional monomer.

In the present invention there is also used a polyfunctional monomer in addition to the dihydroaromatic compound as a crosslinking agent. As examples of such monomer there are mentioned higher esters of methacrylic acid typified by trimethylolpropane trimethacrylate and ethylene glycol dimethacrylate; polyfunctional vinyl monomers typified by divinylbenzene, triallyl isocyanurate and diallyl phthalate; and bismaleimides typified by N,N'-m-phenylene bismaleimide and N,N'-ethylene bismaleimide. Above all, bismaleimides are preferred because they are useful in enhancing the effect of the dynamic heat treatment. These compounds may be used in combination of two or more. Moreover, there may be used a benzothiazole compound or a benzothiazolylsulfenamide compound as an activator if necessary for enhancing the effect of addition of the polyfunctional monomer.

A mixture consisting of the components explained above is heat-treated dynamically to obtain the resin composition of the present invention. The dynamic heat treatment means melt-kneading the mixture to increase the boiling xylene insolubles content as compared with that before the kneading. The effect of the present invention is attained by this heat treatment. Generally, the higher the boiling xylene insolubles content, the greater the improvement in various effects, including impact resistance.

The temperature of the dynamic heat treatment is not lower than the melting point or the softening point of the thermoplastic resin and below the decomposition point thereof. In melt-kneading of the mixture, it is desirable to use a mixing machine which affords a high shear rate to facilitate the formation of radical in the mixture.

The boiling xylene insolubles content is increased mainly by adjusting the amount of the crosslinking agent, which amount can be selected optionally. An appropriate amount of the crosslinking agent is used, depending on the kind of the crosslinking agent used and that of the activator used and melt-kneading apparatus and conditions. If the crosslinking agent is used in an excess amount, there will occur bleeding of the components added, coloration of the resulting composition, or increase of the cost. So the amount of the crosslinking agent to be used may be determined in view of these points. Actually, the amount of the crosslinking agent and the activator, usually irrespective of the kind thereof, is in the range of 0.001 to 5, preferably 0.05 to 3, parts by weight based on 100 parts by weight of the resin.

For the dynamic heat treatment there may be used a known melt-kneading machine such as, for example, open type mixing rolls, non-open type Bumbury's mixer, extruder, kneader, or twin-screw extruder. In the case where the present invention is practised in the aforementioned composition ratio, it is preferable that the kneading temperature and the heat treatment time be in the ranges of 120° to 350° C. and 20 seconds to 20 minutes, respectively.

For the improvement of moldability and flexibility there may be used a softening agent. As a mineral oil or synthetic oil type softening agent there usually is employed the same oil as extender oil which is used mainly for the improvement of processability of rubber, increase of amount, or for improving the dispersibility of a filler. These oils are high-boiling petroleum components and are classified into paraffinic, naphthenic and aromatic oils. Not only these petroleum distillates but also employable in the present invention. The softening agent may be used in an amount of 2 to 300, preferably 5 to 150, parts by weight based on 100 parts by weight of the resin. An amount of the softening agent smaller than 2 parts by weight will bring about no effect and an amount thereof exceeding 300 parts by weight will result in marked deterioration of strength and heat resistance. When the softening agent is to be added is not specially limited, but it is desirable to add the softening agent at the time of melt-kneading the thermoplastic resin.

In the composition of the present invention there may be incorporated, if necessary, stabilizer, antioxidant, ultraviolet ray absorber, lubricant, foaming agent, antistatic agent, flame retardant, plasticizer, dye, pigment, as well as fillers such as talc, calcium carbonate, carbon black, mica, glass fibers, carbon fibers, aramid resins, and asbestos.

EFFECTS OF THE INVENTION

The present invention employs a dihydroaromatic compound as a crosslinking agent, and a polyfunctional monomer whereby an excessive crosslinking reaction which is drawback of the conventional crosslinking agents can be suppressed, and by using such dihydroaromatic compound there can be produced a partially crosslinked product which is crosslinked to a desired extent, ranging from an extremely slight degree of cross-linking up to a greatly crosslinked state, and physical properties can be improved remarkably.

WORKING EXAMPLES AND COMPARATIVE EXAMPLES

The present invention will be described below more concretely in terms of Examples, but the invention is not limited thereto.

EXAMPLES 1-25, COMPARATIVE EXAMPLES 1-25

As thermoplastic resins there were used polypropylene resin, low density polyethylene resin, high density polyethylene resin, linear low-density polyethylene resin, very-low density polyethylene resin, ethylene-propylene random copolymer rubber, ethylene-unsaturated carboxylate copolymer, and polyamide resin.

HOW TO PREPARE COMPOSITIONS 100 parts by weight of each of the above thermoplastic resins were mixed with 3.6 parts of poly-(2,2,4-trimethyl-1,2-dihydroquinoline) and t 4.5 parts of N,N'-phenylene bismaleimide, and the resulting mixture was melt-kneaded using a Laboplastomill (Model 20R200, a product of Toyo Seiki K.K.). Conditions were a reaction time of 5 minutes, 60 revolutions, and a reaction temperature of 230°, and under these conditions, torque was observed in the melt kneading. After completion of the reaction, a boiling xylene insolubles content was determined.

Each of the compositions thus prepared was formed into a 30μ thick film at a blow ratio of 1.8 and a temperature of 200° C. through a spiral die (diameter: 125 mm, lip: 2 mm) of a 40 mm dia. extruder (L/D=20), and physical properties thereof were measured.

The results obtained are as shown in Table 1. In the comparative example the melt kneading was performed without using poly(2,2,4-trimethyl-1,2-dihydroquinoline) and N,N'-m-phenylene bismaleimide. In the same table, torque is represented using the arrows ↑ (rise) and → (unchanged).

METHOD OF TESTING AND MEASUREMENT

Tensile Strength at Break

According to ASTM D882.

Boiling Xylene Insolubles Content

A 20 mm×50 mm×0.2 mm film formed by pressing was put on a 120 mesh wire gauze and immersed in boling xylene for 5 hours. Then, the weight of the film before the immersion and that after the immersion were measured, and a boiling xylene insolubles content was determined from the following equation:

$$\text{Boiling xylene insolubles content (wt \%)} = \frac{\text{Film weight (g) after immersion in boiling xylene}}{\text{Film weight (g) before immersion in boiling xylene}} \times 100$$

EXAMPLES 25-49, COMPARATIVE EXAMPLES 25-52

Polypropylene resin, high density polyethylene resin, linear low-density polyethylene resin, polystyrene resin, polyamide resin, polyester resin, and ethylene-propylene random copolymer rubber were used as mixtures. Specimens were obtained by injection molding and subsequent annealing, unless otherwise described.

How to prepare compositions, as well as conditions for preparing the specimens by injection molding and testing methods are as follows:

HOW TO PREPARE COMPOSITIONS

1) The above thermoplastic resins were mixed in predetermined proportions by means of a Henschel mixer.

2) A crosslinking agent was added to each of the mixtures thus prepared, followed by melt kneading at a resin temperature of 180°-260° C. and a revolution of 200 rpm, using a continuous twin-screw extruder (30 mm dia., a product of Plastic Kogaku Kenku-Sho K. K.), to effect a dynamic heat treatment.

CONDITIONS FOR INJECTION MOLDING

| Molding machine | IS-90B (a product of Toshiba Machine Co., Ltd.) |
|---|---|
| Injection pressure | 1,000 kg/cm$^2$ |
| Molding temperature | 180–260° C. |
| Mold temperature | 50° C. |

METHOD OF TESTING AND MEASUREMENT

MFR

According to JIS K6760, JIS K6758 and JIS K7210.

Yield Tensile Strength and Ultimate Elongation Length

According to JIS K6760, JIS K6758 and JIS K7113.

Flexural Modulus

According to JIS K6758 and JIS K7203.

Vicat Softening Temperature

According to JIS K6760, JIS K6758 and JIS K7206.

Izod Impact Value

According to JIS K6758 and JIS K7110.

Boiling Xylene Insolubles Content

A 20 mm×50 mm×0.2 mm film formed by pressing was put on a 120 mesh wire gauze and immersed in boiling xylene for 5 hours. Then, the weight of the film before the immersion and that after the immersion were measured, and a boiling xylene insolubles content was determined from the following equation:

$$\text{Boiling xylene insolubles content (wt \%)} = \frac{\text{Film weight (g) after immersion in boiling xylene}}{\text{Film weight (g) before immersion in boiling xylene}} = 100$$

Crystallization Temperature

Crystallization temperature was measured as an index of cycle time in the injection molding. It can be considered that the higher the crystallization temperature, the shorter the cycle time in the injection molding because the crystallization rate is high. The measurement was made using a differential scanning calorimeter (SSC/580, a product of Seiko Denshi Kogyo K. K.). About 10 mg of a sample was held at 210° C. for 5 minutes and then the temperature was reduced at a cooling rate of 10° C./min. At this time, the temperature corresponding to a peak of the resulting exotherm curve was regarded as the crystallization temperature.

The results obtained are as set forth in Tables 2 to 4, in which the proportions of crosslinking agents are based on 100 parts by weight of the total amount of thermoplastic resins (this is true also in the following tables).

EXAMPLES 53-65, COMPARATIVE EXAMPLES 50-61

As thermoplastic resins there were used very-low density polyethylenes each in a proportion of 70-90 wt %. Specimens were each prepared by blanking to a predetermined size from a 100 mm×200 mm×2 mm flat plate obtained by injection molding, unless otherwise described. How to prepare compositions was the same as above, but in the melt kneading step 2) of the manufacturing method, the resin temperature was in the range of 150° to 220° C., and where required, a mineral oil-or synthetic oil-based softening agent was added from a reciprocating, fixed displacement pump connected to a vent port.

Conditions for preparing test pieces by injection molding and newly added testing methods are as follows:

CONDITIONS FOR INJECTION MOLDING

| Molding machine | IS-90B (a product of Toshiba Machine Co., Ltd.) |
| --- | --- |
| Injection pressure | 500-1,000 kg/cm² |
| Molding temperature | 180-230° C. |
| Mold temperature | 30-50° C. |

ADDITIONAL TESTING AND MEASUREMENT METHODS

High Load MFR

According to JIS K7210. Temperature 230° C., load 10 kg.

Ultimate Tensile Strength and Ultimate Elongation Length

According to JIS K6301. A speed of testing 200 mm/min.

Durometer Hardness, $H_DA$

According to ISO 868.

Parmanent Set

According to JIS K6301. Extension 100%. No. 3 dumbbell was used.

Vicat Softening Temperature

According to JIS K7206. Load 250 g.

Brittle Temperature

According to JIS K6760 and JIS K7216.

Abrasion Resistance

According to JIS K7204 (using a Taber abrader). Load 1,000 g, Continuous 1,000 revolutions.

How to measure Maximum Peak Temperature (Tm) by Differential Scanning Calorimetry (DSC)

This temperature was measured as a melting point of an very-low density polyethylene. About 5 mg of sample is weighed from a 100 μm thick film obtained by hot pressing, then set to a DSC device, and the temperature is raised to 170° C., at which temperature the sample is held for 15 minutes, followed by cooling to 0° C. at a cooling rate of 2.5° C./min. Then, from this state, the temperature is raised to 170° C. at a rate of 10° C./min, and the temperature in the vertex position of the maximum peak out of peaks appeared during the heating from 0° C. to 170° C. is regarded as Tm.

How to determine Boiling n-Hexane Insolubles Content

A 200 μm thick sheet is formed using a hot press, from which are cut out three 20 mm×30 mm sheets. Using these three sheets, extraction is performed in boiling n-hexane for 5 hours by means of a double-tube type Soxhlet extractor. Then, n-hexane insolubles are taken out and vacuum-dried (at 50° C. for 7 hours). Thereafter, a boiling n-hexane insolubles content is calculated by the following equation:

$$\text{Boiling n-hexane insolubles content (wt \%)} = \frac{\text{Sheet weight after extraction}}{\text{Sheet weight before extraction}} \times 100$$

The results obtained are as shown in Table 5. The proportion of each softening agent in Table 5 is based on the total resin weight assumed to be 100 parts by weight (this is also the same in the following tables).

EXAMPLES 62-69, COMPARATIVE EXAMPLES 56, 57

There were used mixtures selected from polypropylene resin, low density polyethylene resin, very-low density polyethylene resin, ethylene-ethylacrylate copolymer resin and ethylene-propylene random copolymer rubber. How to prepare compositions and test pieces as well as conditions for preparing test pieces by injection molding are the same as in the above Examples 54-61. The following are newly added testing methods.

ADDITIONAL TESTING AND MEASURING METHODS

Spiral Flow

Using a mold having a cavity of a certain spiral, samples were prepared by injection molding under the following conditions, and the length of the spiral of each sample was measured to check melt flow characteristic of the sample.

CONDITIONS FOR INJECTION MOLDING

| | |
|---|---|
| Molding machine | IS-90B (a product of Toshiba Machine Co., Ltd.) |
| Injection pressure | 1,000 kg/cm² |
| Molding temperature | 230° C. |
| Stroke | 25 mm |
| Injection time | 15 sec |
| Curing time | 10 sec |
| Interval time | 3 sec |
| Mold | Archimedes' type, Temperature 50° C. |

Bending Strength

According to JIS K6758 and JIS K7203.

Durometer Hardness, $H_DD$

According to JIS K6760 and JIS K7215.

Surface Roughening and Elongation of Parison

Parisons were formed using an extruder for blow molding in the same manner as above and then evaluated visually for their surface condition and elongation. The evaluation was made in the following three stages: ⊚ ... extremely good, ○ ... good, * ... bad The results obtained are as set out in Table 6. Thermoplastic resins (A) used in the present invention:

A1—Very-low density polyethylene

Ethylene and 1-butene were copolymerized using a catalyst comprising a solid catalyst component and triethylaluminum which solid catalyst component has been obtained from substantially anhydrous magnesium chloride, 1,2-dichloroethane and titanium tetrachloride. The resulting ethylene-1-butene copolymer contained 12 mole % of 1-butene and had the following properties:

| | |
|---|---|
| Density | 0.896 g/cm³ |
| Tm as measured by DSC | 120° C. |
| Boiling n-hexane insolubles content | 74 wt % |
| MFR | 0.9 g/10 min |

A2—Very-low density polyethylene

Ethylene and 1-butene were copolymerized using the same method as in the preparation of A1. The resulting ethylene-1-butene copolymer contained 9.5 mole % of 1-butene and had the following properties:

| | |
|---|---|
| Density | 0.900 g/cm³ |
| Tm as measured by DSC | 120° C. |
| Boiling n-hexane insolubles content | 80 wt % |
| MFR | 0.5 g/10 min |

A3—Very-low density polyethylene

Ethylene and 1-butene were copolymerized using the same method as in the preparation of A1. The resulting ethylene-1-butene copolymer contained 8 moles % of 1-butene and had the following properties:

| | |
|---|---|
| Density | 0.906 g/cm³ |
| Tm as measured by DSC | 121° C. |
| Boiling n-hexane insolubles content | 82 wt % |
| MFR | 5 g/10 min |

A4—Polypropylene, Nisseki Polypro J120G
MFR 1.5, a product of Nippon Petrochemicals Co., Ltd.

A5—Polypropylene, Nisseki Polypro J130G
MFR 4.0, a product of Nippon Petrochemicals Co., Ltd.

A6—Polypropylene, Nisseki Polypro J150G
MFR 8.0, a product of Nippon Petrochemicals Co., Ltd.

A7—Polypropylene, Nisseki Polypro J160G
MFR 14, a product of Nippon Petrochemicals Co., Ltd.

A8—Polypropylene, Nisseki Polypro J170G
MFR 30, a product of Nippon Petrochemicals Co., Ltd.

A9—Polypropylene, Nisseki Polypro J420G
MFR 1.5, a product of Nippon Petrochemicals Co., Ltd.

A10—Polypropylene, Nisseki Polypro J630G
MFR 4.0, a product of Nippon Petrochemicals Co., Ltd.

A11—Polypropylene, Nisseki Polypro J650G
MFR 8.0, a product of Nippon Petrochemicals Co., Ltd.

A12—Polypropylene, Nisseki Polypro J871M
MFR 23, a product of Nippon Petrochemicals Co., Ltd.

A13—Polypropylene, Nisseki Polypro J880G
MFR 40, a product of Nippon Petrochemicals Co., Ltd.

A14—Linear low-density polyethylene
Nisseki Linirex AF1210
MFR 0.8, a product of Nippon Petrochemicals Co., Ltd.

A15—Linear low-density polyethylene
Nisseki Linirex AJ5610
MFR 10, a product of Nippon Petrochemicals Co., Ltd.

A16—Linear low-density polyethylene
Nisseki Linirex AJ6820
MFR 30, a product of Nippon Petrochemicals Co., Ltd.

A17—Linear low-density polyethylene
Nisseki Linirex AJ6285
MFR 32, a product of Nippon Petrochemicals Co., Ltd.

A18—Low density polyethylene
Nisseki Rexlon F102
MFR 0.25, a product of Nippon Petrochemicals Co., Ltd.

A19—Low density polyethylene
Nisseki Rexlon F22
MFR 1.0, a product of Nippon Petrochemicals Co., Ltd.

A20—Low density polyethylene
Nisseki Rexlon F312
MFR 2.0, a product of Nippon Petrochemicals Co., Ltd.

A21—Low density polyethylene
  Nisseki Rexlon F504
  MFR 9.5, a product of Nippon Petrochemicals Co., Ltd.
A22—Ethylene-ethyl acrylate copolymer
  Nisseki Rexlon EEA A3050
A23—Ethylene-ethyl acrylate copolymer
  Nisseki Rexlon EEA A3100
  MFR 3.0, a product of Nippon Petrochemicals Co., Ltd.
A24—Ethylene-ethyl acrylate copolymer
  Nisseki Rexlon EEA A3150
  MFR 3.0, a product of Nippon Petrochemicals Co., Ltd.
A25—Ethylene-ethyl acrylate copolymer
  Nisseki Rexlon EEA A4250
  MFR 5.0, a product of Nippon Petrochemicals Co., Ltd.
A26—High density polyethylene
  Nisseki STAFLENE E809 (M)
  MFR 0.9, a product of Nippon Petrochemicals Co., Ltd.
A27—High density polyethylene
  Nisseki STAFLENE E750 (C)
  MFR 5.3, a product of Nippon Petrochemicals Co., Ltd.
A28—High density polyethylene
  Nisseki STAFLENE E807 (F)
  MFR 0.6, a product of Nippon Petrochemicals Co., Ltd.
A29—Ethylene-propylene random copolymer rubber, EP02P
  $ML_{1+4}=24$, a product of Japan Synthetic Rubber Co., Ltd.
A30—Ethylene-propylene random copolymer rubber, EP07P
  $ML_{1+4}=70$, a product of Japan Synthetic Rubber Co., Ltd.
A31—6-Nylon
  CM1021, a product of Toray Industries Inc.
A32—Polystyrene
  Toporex 525, a product of Mitsui Toatsu Chemicals, Inc.
A33—Polybutylene terephthalate
  PBT310, a product of Toray Industries Inc.

Softening Agent (B)

B1—Mineral process oil, a product of Nippon Oil Co., Ltd.
B2—Liquid polybutene, Nisseki POLYBUTENE LV100, a product of Nippon Petrochemicals Co., Ltd.

Crosslinking Agent (C)

C1—9,10-dihydrophenanthrene
  a product of Tokyo Kasei Kogyo K.K.
C2—6-ethoxy-2,2,4-trimethyl-1,2-dihydroquinoline
  Nocrac AW-D, a product of Ohuchi Shinko Kagaku Kogyo K.K.
C3—Poly-(2,2,4-trimethyl-1,2-dihydroquinoline)
  Nocrac 224-S, a product of Ohuchi Shinko Kagaku Kogyo K.K.
C4—$\alpha,\alpha$-bis(t-butylperoxy)-m-diisopropylbenzene
  Perbutyl P, a product of Nippon Oils & Fats Co., Ltd.

Others (D)

D1—N,N-m-phenylene bismaleimide
  Vulnoc PM, a product of Ohuchi Shinko Kagaku Kogyo K.K.
D2—Divinylbenzene, a product of Tokyo Kasei Kogyo K.K.
D3—Triallyl isocyanurate
  Taic, a product of Nippon Kasei K.K.

TABLE 1

| Comparative Example | Resin (A) | Xylene Insolubles Content (%) | Ultimate Tensile Strength | Example | Torque | Xylene Insolubles Content % | Ultimate Tensile Strength |
|---|---|---|---|---|---|---|---|
| 1 | 1 | 2.3 | | 1 | ↑ | 37.3 | |
| 2 | 2 | 2.4 | | 2 | ↑ | 59.8 | |
| 3 | 3 | 4.8 | | 3 | ↑ | 26.4 | |
| 4 | 4 | 2.8 | | 4 | → | 9.8 | |
| 5 | 5 | 4.7 | | 5 | → | 11.2 | |
| 6 | 8 | 3.0 | | 6 | → | 4.7 | |
| 7 | 9 | 3.0 | | 7 | → | 21.6 | |
| 8 | 10 | 3.3 | | 8 | → | 16.7 | |
| 9 | 14 | 0.8 | 300 | 9 | → | 20.0 | 400 |
| 10 | 15 | 2.3 | | 10 | → | 23.5 | |
| 11 | 16 | 2.8 | | 11 | → | 6.6 | |
| 12 | 17 | 3.4 | | 12 | → | 19.2 | |

| Comp. Ex. | Ex. (A) | Xylene Insolubles Content (%) | Ultimate Tensile Strength | Ex. | Torque | Xylene Insolubles Content % | Ultimate Tensile Strength |
|---|---|---|---|---|---|---|---|
| 13 | 18 | 3.2 | 190 | 13 | → | 27.6 | 270 |
| 14 | 20 | 4.0 | 140 | 14 | → | 9.0 | 200 |
| 15 | 21 | 5.5 | | 15 | → | 28.6 | |
| 16 | 23 | 4.0 | 160 | 16 | → | 14.7 | 210 |
| 17 | 24 | 4.3 | | 17 | → | 16.0 | |
| 18 | 25 | 3.5 | | 18 | → | 17.5 | |
| 19 | 26 | 2.8 | | 19 | ↑ | 47.8 | |
| 20 | 27 | 3.9 | | 20 | ↑ | 26.8 | |
| 21 | 28 | 0.6 | | 21 | ↑ | 28.0 | |
| 22 | 29 | 3.1 | | 22 | ↑ | 41.3 | |
| 23 | 30 | 3.0 | | 23 | ↑ | 58.3 | |
| 24 | 31 | / | | 24 | ↑ | / | |

The ultimate tensile strength indicates a tensile break strength in $kgf/cm^2$.

TABLE 2

| Ex. | Component (A) Kind | Component (A) Amount (wt %) | Component (A) Kind | Component (A) Amount (wt %) | Comp. (B) Kind | Comp. (B) Amount (wt %) | Comp. (C) Kind | Comp. (C) Amount (wt %) | Heat Treatment Conditions temp. (°C.) | Heat Treatment Conditions time (sec) | Melt Flow Rate (g/10) (min) |
|---|---|---|---|---|---|---|---|---|---|---|---|
| Comp. Ex. 25 | All | 90 | A29 | 10 | | | | | | | 7.0 |
| Ex. 25 | All | 90 | A29 | 10 | C2 | 0.05 | D1 | 0.1 | 220 | 60 | 5.2 |
| Comp. Ex. 26 | All | 80 | A29 | 20 | | | | | | | 6.0 |
| Ex. 26 | All | 80 | A29 | 20 | C1 | 0.1 | D3 | 0.15 | 220 | 60 | 3.1 |
| Comp. Ex. 27 | All | 80 | A30 | 20 | | | | | | | 4.3 |
| Ex. 27 | All | 80 | A30 | 20 | C2 | 0.2 | D1 | 0.3 | 180 | 60 | 1.3 |
| Comp. Ex. 28 | All | 80 | A29 | 20 | | | D2 | 0.3 | | | 2.9 |
| Comp. Ex. 29 | All | 80 | A29 | 20 | | | D1 | 0.3 | 220 | 60 | 2.8 |
| Ex. 23 | All | 80 | A29 | 20 | C2 | 0.2 | D1 | 0.3 | 220 | 60 | 1.5 |
| Ex. 29 | All | 80 | A29 | 20 | C1 | 0.2 | D1 | 0.3 | 220 | 60 | 1.6 |

| Ex. | Yield Tensile Strength (kgf/cm²) | Ultimate Elongation Length (%) | Flexural Modulus (kgf/cm²) | Vicat Softening Temp. (°C.) | Izod Impact Value (notched) (kgf/cm²) 23° C. | Izod Impact Value (notched) (kgf/cm²) −10° C. | Izod Impact Value (notched) (kgf/cm²) −30° C. | Boiling Xylene Insolubles Content (wt %) | Crystallization Temp. (°C.) |
|---|---|---|---|---|---|---|---|---|---|
| Comp. Ex. 25 | 210 | >300 | 10,900 | 143 | >66 | 30.2 | 4.5 | 0.7 | |
| Ex. 25 | 240 | >300 | 10,800 | 145 | >66 | 50.2 | 10.1 | 7.2 | |
| Comp. Ex. 26 | 220 | 200 | 9,900 | 135 | >66 | 45.0 | 10.5 | 0.8 | 112.9 |
| Ex. 26 | 200 | >300 | 9,000 | 137 | >66 | >66 | 21.2 | 15.8 | 114.9 |
| Comp. Ex. 27 | 200 | >300 | 9,700 | 134 | >66 | 37.3 | 11.6 | 0.9 | |
| Ex. 27 | 230 | >300 | 9,500 | 140 | >66 | >66 | 21.9 | 15.9 | |
| Comp. Ex. 28 | 200 | >300 | 9,900 | 134 | >66 | >66 | 13.0 | 1.5 | |
| Comp. Ex. 29 | 190 | >300 | 9,500 | 134 | >66 | >66 | 13.1 | 1.5 | |
| Ex. 23 | 230 | >300 | 9,200 | 140 | >66 | >66 | 55.0 | 11.5 | 116.5 |
| Ex. 29 | 230 | >300 | 9,200 | 139 | >66 | >66 | 47.0 | 11.2 | 116.1 |

| Ex. | Component (A) Kind | Component (A) Amount (wt %) | Component (A) Kind | Component (A) Amount (wt %) | Comp. (B) Kind | Comp. (B) Amount (wt %) | Comp. (C) Kind | Comp. (C) Amount (wt %) | Heat Treatment Conditions Temp. (°C.) | Heat Treatment Conditions Time (sec) | Melt Flow Rate (g/10 min) |
|---|---|---|---|---|---|---|---|---|---|---|---|
| Comp. Ex. 30 | A6 | 100 | | | | | | | | | 8.2 |
| Comp. Ex. 31 | A6 | 80 | A30 | 20 | | | | | | | 4.5 |
| Ex. 30 | A6 | 80 | A30 | 20 | C2 | 0.2 | D2 | 0.4 | 220 | 120 | 1.5 |
| Comp. Ex. 32 | A6 | 80 | A29 | 20 | C2 | 0.2 | | | 180 | 60 | 5.0 |
| Comp. Ex. 33 | A6 | 80 | A29 | 20 | C3 | 0.3 | | | 180 | 60 | 5.1 |
| Comp. Ex. 34 | A6 | 80 | A29 | 20 | C1 | 0.2 | | | 180 | 60 | 5.0 |
| Ex. 31 | A6 | 80 | A29 | 20 | C2 | 0.2 | D1 | 0.3 | 180 | 60 | 2.5 |
| Ex. 32 | A6 | 80 | A29 | 20 | C2 | 0.2 | D2 | 0.4 | 180 | 60 | 2.9 |
| Ex. 33 | A6 | 80 | A29 | 20 | C2 | 0.2 | D3 | 0.3 | 180 | 60 | 2.5 |
| Ex. 34 | A6 | 80 | A29 | 20 | C2 | 0.1 | D1 | 0.15 | 220 | 60 | 2.7 |
| Ex. 35 | A6 | 80 | A29 | 20 | C2 | 0.1 | D1 | 0.15 | 220 | 30 | 2.8 |
| Ex. 36 | A6 | 80 | A29 | 20 | C2 | 0.05 | D1 | 0.08 | 220 | 60 | 3.0 |
| Comp. Ex. 35 | A15 | 80 | A30 | 20 | | | | | | | 5.0 |
| Ex. 37 | A15 | 80 | A30 | 20 | C2 | 0.2 | D2 | 0.4 | 180 | 60 | 1.3 |

| Ex. | Yield Tensile Strength (kgf/cm²) | Ultimate Elongation Length (%) | Flexural Modulus (kgf/cm²) | Vicat Softening Temp. (°C.) | Izod Impact Value (notched) (kgf/cm²) 23° C. | Izod Impact Value (notched) (kgf/cm²) −10° C. | Izod Impact Value (notched) (kgf/cm²) −30° C. | Boiling Xylene Insolubles Content (wt %) | Crystallization Temp. (°C.) |
|---|---|---|---|---|---|---|---|---|---|
| Comp. Ex. 30 | 350 | >300 | 17,500 | 151 | 12.2 | 5.3 | 5.1 | 1.6 | 111.5 |
| Comp. Ex. 31 | 210 | >300 | 11,200 | 135 | >66 | 11.2 | 10.3 | 1.6 | 113.0 |
| Ex. 30 | 230 | >300 | 10,700 | 138 | >66 | 21.6 | 16.1 | 15.1 | 116.2 |
| Comp. Ex. 32 | 210 | >300 | 9,200 | 136 | >66 | 10.5 | 8.2 | 1.2 | 112.1 |
| Comp. Ex. 33 | 210 | >300 | 9,500 | 136 | >66 | 10.3 | 7.6 | 1.2 | 112.0 |
| Comp. Ex. 34 | 210 | >300 | 9,300 | 136 | >66 | 10.3 | 7.3 | 1.9 | 112.0 |
| Ex. 31 | 230 | >300 | 9,100 | 140 | >66 | >66 | 19.2 | 10.2 | 112.3 |
| Ex. 32 | 230 | >300 | 9,100 | 140 | >66 | >66 | 18.6 | 9.2 | 112.2 |
| Ex. 33 | 230 | >300 | 9,100 | 140 | >66 | >66 | 22.0 | 8.2 | 112.0 |
| Ex. 34 | 210 | >300 | 9,100 | 139 | >66 | >66 | 31.8 | 13.5 | 116.5 |
| Ex. 35 | 210 | >300 | 9,100 | 137 | >66 | >66 | 20.8 | 12.1 | 116.2 |
| Ex. 36 | 210 | >300 | 9,200 | 138 | >66 | >66 | 14.9 | 12.1 | 116.2 |
| Comp. Ex. 35 | 92 | >300 | 1,800 | 128 | >66 | >66 | >66 | −0.9 | |
| Ex. 37 | 98 | >300 | 1,700 | 134 | >66 | >66 | >66 | 17.5 | |

TABLE 4

| Ex. | Component (A) Kind | Component (A) Amount (wt %) | Comp. (A) Kind | Comp. (A) Amount (wt %) | Comp. (B) Kind | Comp. (B) Amount (wt %) | Comp. (C) Kind | Comp. (C) Amount (wt %) | Heat Treatment temp. (°C) | Heat Treatment time (sec) | Melt Flow Rate (g/10 min) | Yield Tensile Strength (kgf/cm²) | Ultimate Elongation Length (%) |
|---|---|---|---|---|---|---|---|---|---|---|---|---|---|
| Comp. Ex. 36 | A4 | 100 | | | | | | | | | 1.5 | 330 | >300 |
| Comp. Ex. 37 | A4 | 80 | A30 | 20 | | | | | | | 0.9 | 220 | 220 |
| Ex. 38 | A4 | 80 | A30 | 20 | C2 | 0.2 | D1 | 0.3 | 180 | 60 | 0.5 | 240 | >300 |
| Comp. Ex. 38 | A4 | 65 | A29 | 35 | | | | | | | 1.8 | 195 | >300 |
| Ex. 39 | A4 | 65 | A29 | 35 | C2 | 0.3 | D1 | 0.5 | 220 | 60 | 0.7 | 180 | >300 |
| Comp. Ex. 39 | A9 | 100 | | | | | | | | | 1.5 | 230 | >300 |
| Ex. 40 | A9 | 80 | A29 | 20 | C2 | 0.2 | D2 | 0.4 | 220 | 60 | 0.5 | 180 | >300 |
| Ex. 41 | A9 | 80 | A29 | 20 | C2 | 0.2 | D1 | 0.3 | 220 | 60 | 0.6 | 180 | >300 |
| Comp. Ex. 40 | A13 | 100 | | | | | | | | | 40 | 280 | 100 |
| Comp. Ex. 41 | A13 | 80 | A30 | 20 | | | | | | | 11.6 | 190 | 120 |
| Ex. 42 | A13 | 80 | A30 | 20 | C2 | 0.2 | D1 | 0.3 | 180 | 60 | 6.0 | 185 | 200 |
| Comp. Ex. 42 | A13 | 80 | A29 | 20 | | | | | | | 13.5 | 210 | 130 |
| Ex. 43 | A13 | 80 | A29 | 20 | C2 | 0.2 | D1 | 0.3 | 180 | 60 | 6.3 | 210 | 180 |
| Comp. Ex. 43 | A12 | 80 | A29 | 20 | | | | | | | 11.0 | 180 | 70 |
| Ex. 44 | A12 | 80 | A29 | 20 | C2 | 0.2 | D1 | 0.3 | 220 | 60 | 5.0 | 190 | 190 |
| Comp. Ex. 44 | A12 | 80 | A30 | 20 | | | | | | | 9.0 | 180 | 60 |
| Ex. 45 | A12 | 80 | A30 | 20 | C2 | 0.1 | D1 | 0.1 | 220 | 60 | 6.1 | 180 | 190 |
| Comp. Ex. 45 | A28 | 100 | | | | | | | | | | | |
| Comp. Ex. 46 | A28 | 80 | A30 | 20 | | | | | | | | | |
| Ex. 46 | A28 | 80 | A30 | 20 | C2 | 0.2 | D1 | 0.3 | 190 | 75 | | | |
| Comp. Ex. 47 | A32 | 100 | | | | | | | | | | | |
| Comp. Ex. 48 | A32 | 80 | A29 | 20 | | | | | | | | | |
| Ex. 47 | A32 | 80 | A29 | 20 | C2 | 0.2 | D1 | 0.3 | 190 | 60 | | | |
| Comp. Ex. 49 | A31 | 100 | | | | | | | | | | 720 | 220 |
| Comp. Ex. 50 | A31 | 80 | A30 | 20 | | | | | | | | 400 | 30 |
| Ex. 48 | A31 | 80 | A30 | 20 | C1 | 0.3 | D1 | 0.3 | 260 | 60 | | 420 | 180 |
| Comp. Ex. 51 | A33 | 100 | | | | | | | | | | 530 | 250 |
| Comp. Ex. 52 | A33 | 80 | A30 | 20 | | | | | | | | 320 | 130 |
| Ex. 49 | A33 | 80 | A30 | 20 | C1 | 0.3 | D1 | 0.3 | 260 | 60 | | 310 | 280 |

| Ex. | Flexural Modulus (kgf/cm²) | Vicat Softening Temp. (°C) | Izod Impact Value (notched) (kgf/cm²) 23° C. | Izod Impact Value (notched) (kgf/cm²) −10° C. | Izod Impact Value (notched) (kgf/cm²) −30° C. | Boiling Xylene Insolubles Content (wt %) | Crystallization Temp. (°C) |
|---|---|---|---|---|---|---|---|
| Comp. Ex. 36 | 15,500 | 150 | 8.2 | 3.6 | 3.3 | 0.4 | 114.7 |
| Comp. Ex. 37 | 11,300 | 141 | 23.2 | 6.6 | 6.2 | 0.8 | 112.9 |
| Ex. 38 | 11,300 | 143 | 58.9 | 14.0 | 9.0 | 10.1 | 114.5 |
| Comp. Ex. 38 | 9,200 | 131 | >66 | 15.0 | 10.8 | 1.2 | |
| Ex. 39 | 8,900 | 135 | >66 | >66 | >66 | 21.0 | |
| Comp. Ex. 39 | 9,000 | 118 | 25.3 | 6.5 | 6.2 | 0.8 | 111.1 |
| Ex. 40 | 7,000 | 100 | 59.2 | 8.2 | 7.4 | 11.8 | 109.4 |
| Ex. 41 | 6,800 | 101 | 63.8 | 15.8 | 10.7 | 9.5 | 109.4 |
| Comp. Ex. 40 | 14,500 | 148 | 10.1 | 5.6 | 5.2 | 1.3 | |
| Comp. Ex. 41 | 11,800 | 132 | 28.1 | 8.0 | 7.0 | 1.6 | |
| Ex. 42 | 11,000 | 137 | 40.7 | 13.2 | 9.1 | 18.5 | |
| Comp. Ex. 42 | 12,000 | 134 | 23.3 | 7.3 | 6.3 | 1.6 | |
| Ex. 43 | 11,900 | 138 | 29.3 | 9.9 | 8.1 | 17.0 | |
| Comp. Ex. 43 | 10,800 | 135 | 18.0 | 9.0 | 8.2 | 1.8 | |
| Ex. 44 | 10,000 | 140 | 61.6 | 13.2 | 11.3 | 17.0 | |
| Comp. Ex. 44 | 10,500 | 136 | 18.0 | 9.2 | 8.0 | 0.9 | |
| Ex. 45 | 10,500 | 140 | >66 | 20.8 | 12.0 | 16.8 | |
| Comp. Ex. 45 | 13,000 | | | | 4.5 | 0.8 | |
| Comp. Ex. 46 | 9,100 | | | | 20.1 | 1.3 | |
| Ex. 46 | 9,000 | | | | 51.3 | 13.2 | |
| Comp. Ex. 47 | 29,500 | | | | 2.0 | 1.0 | |
| Comp. Ex. 48 | 21,000 | | | | 5.0 | 1.7 | |
| Ex. 47 | 20,700 | | | | 21.0 | 11.0 | |
| Comp. Ex. 49 | 26,100 | | 4.5 | | | 98.8 | |
| Comp. Ex. 50 | 22,000 | | 5.9 | | | 80.8 | |
| Ex. 48 | 22,300 | | 36.9 | | | 90.6 | |
| Comp. Ex. 51 | 24,300 | | 6.0 | | | 98.5 | |
| Comp. Ex. 52 | 15,600 | | 20.8 | | | 79.9 | |
| Ex. 49 | 15,000 | | 33.0 | | | 90.8 | |

TABLE 5

| | Composition | Heat Treatment |
|---|---|---|

TABLE 5-continued

| Ex. | Component (A) Kind | Amount (wt %) | Kind | Amount (wt %) | Comp. (B) Kind | Amount (wt %) | Comp. (C) Kind | Amount (wt %) | Comp. (D) Kind | Amount (wt %) | Conditions temp. (°C.) | time (sec) |
|---|---|---|---|---|---|---|---|---|---|---|---|---|
| Comp. Ex. 53 | A1 | 70 | A29 | 30 | | | | | | | | |
| Ex. 50 | A1 | 70 | A29 | 30 | | | C2 | 0.3 | D1 | 0.4 | 220 | 70 |
| Ex. 51 | A1 | 70 | A29 | 30 | B1 | 20 | C2 | 0.3 | D1 | 0.4 | 220 | 70 |
| Comp. Ex. 54 | A1 | 70 | A29 | 30 | | | C4 | 0.1 | | | 220 | 70 |
| Comp. Ex. 55 | A1 | 70 | A29 | 30 | | | C4 | 0.3 | D2 | 0.3 | 220 | 70 |
| Comp. Ex. 56 | A2 | 70 | A30 | 30 | | | | | | | | |
| Ex. 52 | A2 | 70 | A30 | 30 | | | C2 | 0.3 | | | 180 | 75 |
| Ex. 53 | A2 | 70 | A30 | 30 | | | C2 | 0.3 | D2 | 0.4 | 180 | 75 |
| Comp. Ex. 57 | A2 | 70 | A29 | 30 | | | | | | | | |
| Ex. 54 | A2 | 70 | A29 | 30 | | | C2 | 0.3 | D1 | 0.4 | 180 | 60 |
| Comp. Ex. 58 | A3 | 90 | A30 | 10 | | | | | | | | |
| Ex. 55 | A3 | 90 | A30 | 10 | | | C1 | 0.11 | D1 | 0.11 | 180 | 60 |
| Comp. Ex. 59 | A3 | 70 | A30 | 30 | | | | | | | | |
| Ex. 56 | A3 | 70 | A30 | 30 | | | C2 | 0.4 | D1 | 0.5 | 180 | 60 |
| Ex. 57 | A3 | 70 | A30 | 30 | B2 | 20 | C2 | 0.4 | D1 | 0.5 | 180 | 60 |

| Ex. | High-Load Melt Flow Rate (g/10 min) | Ultimate Tensile Strength (kgf/cm²) | Ultimate Elongation Length (%) | Flexural Modulus (kgf/cm²) | Durometer Hardness (H_DA) | Parmanent Set (100% elongation) (%) | Vicat Softening Temp. (250 g) (°C.) | Brittle Temp. (°C.) | Boiling Xylene Insolubles Content (wt %) | abrasion Resistance (Taper type) (mg/1000 times) |
|---|---|---|---|---|---|---|---|---|---|---|
| Comp. Ex. 53 | 20 | 50 | >300 | 700 | 78 | 35 | 61 | <−70 | 1.8 | |
| Ex. 50 | 7 | 150 | >300 | 840 | 90 | 18 | 88 | <−70 | 25.6 | |
| Ex. 51 | 11 | 142 | >300 | 590 | 81 | 18 | 79 | <−70 | 20.5 | |
| Comp. Ex. 54 | 1 | 80 | 100 | 800 | 89 | 20 | 75 | <−70 | 42.1 | |
| Comp. Ex. 55 | Unmoldable | | | | | Unmoldable | | | | |
| Comp. Ex. 56 | 5 | 60 | >300 | 920 | 83 | 38 | 58 | <−70 | 1.5 | |
| Ex. 52 | 2 | 91 | >300 | 950 | 85 | 18 | 74 | <−70 | 14.1 | |
| Ex. 53 | 0.8 | 115 | >300 | 950 | 88 | 17 | 83 | <−70 | 28.5 | |
| Comp. Ex. 57 | 8 | 50 | >300 | 700 | 71 | 35 | 58 | <−70 | 0.8 | |
| Ex. 54 | 5 | 80 | >300 | 700 | 75 | 28 | 67 | <−70 | 7.1 | |
| Comp. Ex. 58 | | 150 | >300 | 1050 | 96 | 35 | 100 | | 1.1 | 19 |
| Ex. 55 | 18 | 160 | >300 | 1150 | >98 | 30 | 110 | | 7.6 | 9 |
| Comp. Ex. 59 | 27 | 105 | >300 | 650 | 84 | 25 | 81 | | 0.9 | 25 |
| Ex. 56 | 8 | 110 | >300 | 700 | 88 | 21 | 101 | | 30.0 | 10 |
| Ex. 57 | 36 | 110 | >300 | 700 | 84 | 18 | 90 | | 24.7 | 10 |

TABLE 6

| Ex. | Component (A) Kind | Amount | Kind | Amount | Kind | Amount | Comp. (B) Kind | Amount | Comp. (B) Kind | Amount | Comp. (D) Kind | Amount | Heat Treatment Conditions Temperature (°C.) | Time (sec) |
|---|---|---|---|---|---|---|---|---|---|---|---|---|---|---|
| Ex. 58 | A7 | 55 | A19 | 12 | A30 | 33 | B1 | 20 | C3 | 0.45 | D1 | 0.50 | 240 | 60 |
| Comp. Ex. 60 | A7 | 55 | A19 | 12 | A30 | 33 | B1 | 20 | C4 | 0.30 | D2 | 0.30 | 240 | 60 |
| Ex. 59 | A9 | 65 | A2 | 10 | A29 | 25 | B1 | 10 | C3 | 0.25 | D1 | 0.30 | 240 | 60 |
| Ex. 60 | A9 | 57 | A2 | 10 | A29 | 33 | B1 | 20 | C3 | 0.40 | D1 | 0.45 | 240 | 60 |
| Ex. 61 | A11 | 67 | | | A30 | 33 | B1 | 20 | C3 | 0.45 | D1 | 0.50 | 240 | 60 |
| Ex. 62 | A13 | 67 | | | A30 | 33 | B1 | 20 | C3 | 0.45 | D1 | 0.50 | 240 | 60 |
| Ex. 63 | A11 | 55 | A3 | 15 | A29 | 30 | B1 | 20 | C3 | 0.30 | D1 | 0.35 | 240 | 60 |
| Ex. 64 | A12 | 57 | A22 | 10 | A30 | 33 | B1 | 20 | C3 | 0.45 | D1 | 0.50 | 240 | 60 |
| Comp. Ex. 61 | A12 | 57 | A22 | 10 | A30 | 33 | B1 | 20 | C4 | 0.30 | D1 | 0.30 | 240 | 60 |
| Ex. 65 | A11 | 40 | A3 | 30 | A30 | 30 | B1 | 20 | C3 | 0.30 | D1 | 0.35 | 240 | 60 |

| Ex. | Spiral Flow (mm) | Ultimate Tensile Strength (kgf/cm²) | Ultimate Elongation Length (%) | Bending Strength (kgf/cm²) | Flexural Modulus (kgf/cm²) | Durometer Hardness (H_DD) [H_DA] | Parmanent Set (100% elongation) | Vicat Softening Temperature | Izod Impact Value (notched) (kgf/cm²) −30° C. | −40° C. | Boiling Xylene Insolubles Content (wt %) | Surface Roughening and Elongation of Parison |
|---|---|---|---|---|---|---|---|---|---|---|---|---|
| Ex. 58 | | 110 | 550 | 62 | 2,100 | 45 | 51 | 63 | >66 | >66 | 21.2 | ○ |
| Comp. Ex. 60 | | 93 | 405 | 57 | 1,800 | 44 | 42 | 58 | >66 | 44.0 | 41.0 | X |
| Ex. 59 | | 194 | 480 | 118 | 4,200 | 52 | 45 | 112 | >66 | >66 | 22.2 | ◎ |
| Ex. 60 | | 155 | 480 | 72 | 2,370 | 46 | 38 | 91 | >66 | >66 | 25.3 | ◎ |
| Ex. 61 | 760 | 120 | 550 | 88 | 2,950 | 45 | 47 | 92 | >66 | >66 | 22.1 | |
| Ex. 62 | 880 | 120 | 550 | 88 | 2,800 | 45 | 44 | 92 | >66 | >66 | 21.0 | |
| Ex. 63 | 700 | 132 | 550 | 88 | 3,050 | 48 | 48 | 91 | >66 | >66 | 22.5 | |
| Ex. 64 | 660 | 135 | 550 | 95 | 3,300 | 47 | 48 | 82 | >66 | >66 | 25.0 | |

TABLE 6-continued

| | | | | | | | | | | | |
|---|---|---|---|---|---|---|---|---|---|---|---|
| Comp. Ex. 61 | 550 | 100 | 400 | 70 | 2,450 | 44 | 49 | 83 | >66 | 46.0 | 35.0 |
| Ex. 65 | 552 | 109 | 540 | 45 | 1,520 | [95] | 33 | 67 | >66 | >66 | 22.1 |

What is claimed is:

1. A partially crosslinked thermoplastic resin composition prepared by dynamically heat-treating a thermoplastic resin having substantially no carbon-carbon bond unsaturation in the presence of a dihydroaromatic compound as a crosslinking agent, said dihydroaromatic compound being selected from the group consisting of a 1,2-dihydroquinoline compound, a polymer thereof and 9,10-dihydrophenanthrene; and a polyfunctional monomer.

2. A thermoplastic resin composition as set forth in claim 1, wherein said thermoplastic resin comprises a polyolefin resin and a heterogeneous thermoplastic resin.

3. A thermoplastic resin composition as set forth in claim 1, wherein said thermoplastic resin is constituted by only a mixture of at least two kinds of polyolefin resins.

4. A thermoplastic resin composition as set forth in claim 2, wherein said polyolefin resin includes at least one member selected from the group consisting of polypropylenes and ethylene (co)polymers.

5. A thermoplastic resin composition as set forth in claim 1, wherein said polyfunctional monomer is a bismaleimide compound.

6. A thermoplastic resin composition as set forth in claim 1, wherein a softening agent is also used together with the thermoplastic resin.

* * * * *